United States Patent [19]

Engel et al.

[11] 4,338,630
[45] Jul. 6, 1982

[54] ONE-CHIP CHROMA/LUMA IC: D.C. COUPLING REDUCTION CIRCUIT

[75] Inventors: Christopher M. Engel, Arlington Heights; George J. Tzakis, Glenview, both of Ill.

[73] Assignee: Zenith Radio Corporation, Glenview, Ill.

[21] Appl. No.: 216,451

[22] Filed: Dec. 15, 1980

[51] Int. Cl.³ .............................................. H04N 5/18
[52] U.S. Cl. .................................................... 358/172
[58] Field of Search ................ 358/168, 169, 171, 172

[56] References Cited

U.S. PATENT DOCUMENTS 4,110,790  8/1978  Wheeler .......................... 358/172 X
4,237,489 12/1980  Kresock .......................... 358/172 X

OTHER PUBLICATIONS

IEEE Transactions on Consumer Electronics, vol. CE-24, No. 3, Aug. 1978, Kenneth R. Skinner, William A. Cocke.

Primary Examiner—Robert L. Richardson
Attorney, Agent, or Firm—Jack Kail

[57] ABSTRACT

A DC coupling reduction circuit for use in a television receiver having a DC restoration circuit comprises means for developing a dynamic adjustment signal by attenuating a video signal by a selected percentage, inverting the attenuated signal and low pass filtering the attenuated and inverted signal. The dynamic adjustment signal is combined with a viewer selected direct current black level reference signal to produce a combined signal which is coupled to the black clamp level determining input of the DC restoration circuit whereby the black level of the video signal is clamped at a potential which is a function of the video signal. Preferably, the cut-off point of the cathode ray tube of the television receiver is set at a level between the levels of the combined signals produced in response to a video signal representing a white image and a video signal representing a black image.

8 Claims, 2 Drawing Figures

ONE-CHIP CHROMA/LUMA IC: D.C. COUPLING REDUCTION CIRCUIT

BACKGROUND OF THE INVENTION

The present invention relates generally to television receivers and, in particular, to a circuit for dynamically adjusting the value of the black level clamp voltage of a DC restoration circuit, such adjustment circuits commonly being referred to as DC coupling reduction circuits.

The video component of a transmitted television signal is characterized by a DC level determining the average background brightness of the televised scene. In order for the reproduced image at the television receiver to have the proper background brightness, i.e. the proper level with respect to black, the transmitted DC component must be retained or otherwise restored in the receiver. In television receivers employing direct coupling techniques throughout the entire video section, the DC component of the composite video signal is inherently maintained by the receiver and no special circuits are necessary to insure the reproduction of a picture having a proper average background brightness level. However, for purposes of simplicity and economy, as well as to prevent the accummulation of system errors, most modern television receivers have video sections incorporating RC coupling circuits. As a result of the DC blocking action of the coupling capacitors in these circuits, the background brightness determining component of the video signal is normally lost or reduced and must therefore be suitably restored in the receiver to enable reproduction of an acceptable picture.

Various forms of DC restoration circuits have been devised for accomplishing the foregoing function of restoring the DC level of the video component of a transmitted television signal. One such DC restoration circuit is disclosed in copending application Ser. No. 118,127 filed Feb. 4, 1980, now U.S. Pat. No. 4,293,874, and assigned to the assignee of the present invention. Another DC restoration circuit is illustrated in an article entitled "A Versatile Low-Level Luminance IC for TV" appearing on pages 169–175 of the August 1978 issue of IEEE Transactions on Consumer Electronics, Vol. CE-24, No. 3. In both of these circuits, a viewer operable brightness control is used to establish a selected black level in the form of a DC reference potential which is coupled to a feedback network for clamping the back porch of the horizontal blanking interval of the video signal to the selected reference potential. Thus, in response to adjustment of the brightness control, the viewer may adjust the black level to a desired setting. However, once the brightness control is set to a selected position corresponding to a particular reference potential, the back porch of the horizontal blanking interval remains fixedly clamped to this potential independent of the average or DC level of the associated video signal. A DC restoration circuit operating in this manner, i.e. where the back porch is clamped to a fixed level, is said to be characterized by 100% DC coupling.

In certain instances it has been found desirable to decrease the amount of DC coupling from the 100% value to a somewhat lower value typically on the order of about 85%. This reduction in the level of DC coupling permits a dynamic adjustment in the clamping level of the back porch which serves to compensate for broadcast transmission inconsistencies by slightly decreasing the average background brightness of a highly white scene and by increasing the average background brightness of a dark scene. In the past, such DC coupling reduction circuits have typically taken the form of a resistive voltage divider connected in parallel with a relatively large value capacitor and inserted directly in the video signal transmission path. Circuits of this type are considered undesirable in modern television receivers where integrated circuit technology finds widespread use since additional integrated circuit chip pins must be provided to enable connection of the circuits.

It is accordingly a basic object of the present invention to provide a novel DC coupling reduction circuit for dynamically adjusting the clamping level of a DC restoration circuit in accordance with the average DC level of a video signal. It is a further object of the invention to provide a DC coupling reduction circuit which may be incorporated on an integrated circuit chip together with a DC restoration circuit without necessitating the inclusion of additional integrated circuit chip pins.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings in which:

DESCRIPTION OF THE PREFERRED EMDOBIMENT

Figure 1:
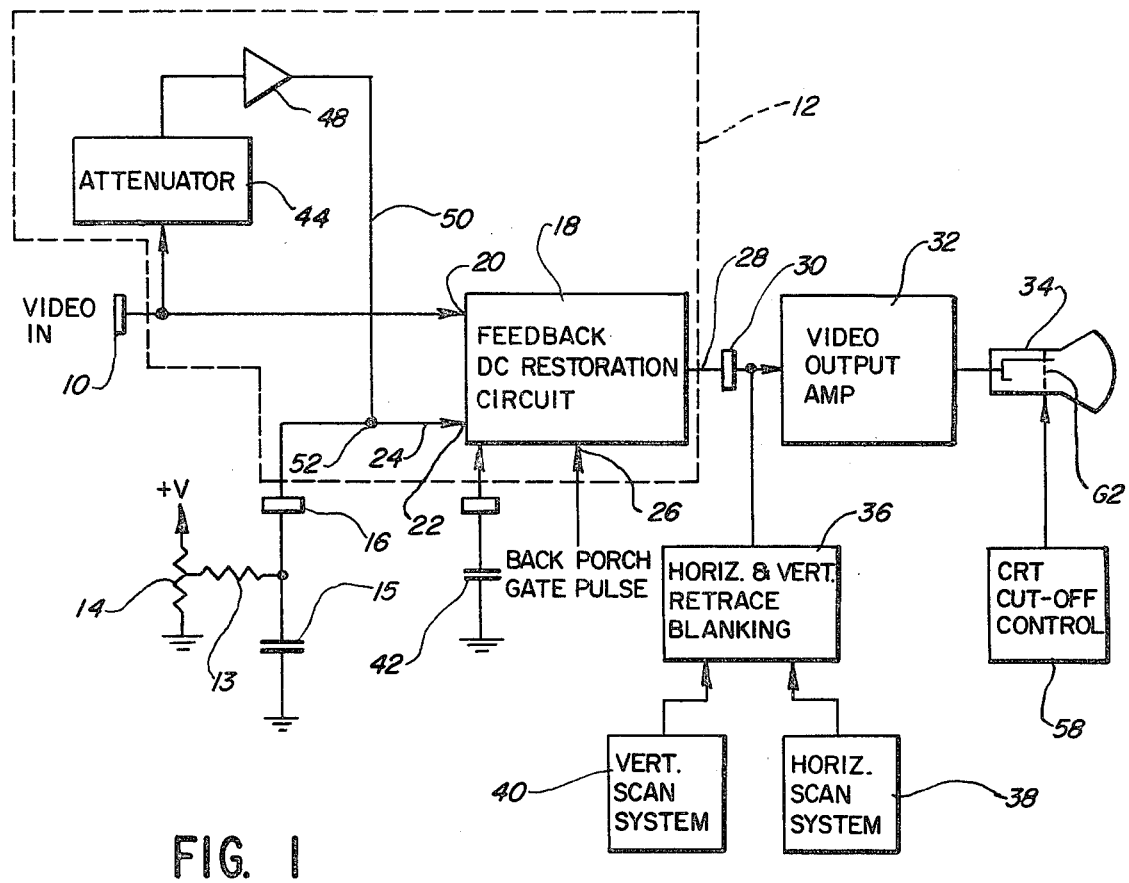
FIG. 1 is a block diagram illustrating a DC coupling reduction circuit constructed according to the present invention and operable in association with a DC restoration circuit.

Referring now to the drawings and, in particular, to FIG. 1, an input video signal, such as would be developed at the output of the video detector of a conventional monochrome or color television receiver, is coupled to an input pin 10 of an integrated circuit chip 12. A DC reference potential developed at the output of a viewer adjustable brightness control potentiometer 14 is coupled to integrated circuit chip 12 through a resistor 13 and a second input pin 16 which is also connected to ground by a bypass capacitor 15, both resistor 13 and bypass capacitor 15 being located externally of integrated circuit chip 12. The integrated circuit chip preferably includes a feedback type DC restoration circuit 18 which may comprise, for example, either the circuit described in the previously mentioned copending application or the circuit set forth in the previously mentioned IEEE article. In any case, DC restoration circuit 18 is operable for establishing a suitable DC level for the processed video signal so as to maintain a desired average background brightness or black level in the reproduced scene.

More specifically, DC restoration circuit 18 includes a first input 20 responsive to the input video signal developed at input pin 10 and a second input 22 for receiving a reference potential signal developed on a conductor 24. An additional input 26 receives a back porch gate pulse for enabling the operation of DC restoration circuit 18. The output of DC restoration circuit 18 comprises a DC restored video output signal which is coupled by a conductor 28 and an output pin 30 to the input of a 100% DC coupled video output amplifier 32. Video amplifier 32, in turn, couples the amplified video signal to the cathode of a CRT 34 for reproducing an image in accordance with the video signal. Also, the input of video amplifier 32 is connected to the output of a horizontal and vertical retrace blanking circuit 36 which operates to blank the CRT beam during horizontal and vertical retrace in response to horizontal and vertical blanking pulses developed at the output of the horizontal and vertical scan systems 38 and 40 respectively of the receiver.

In operation, consider initially the situation where conductor 24 is connected only to input pin 16 for coupling a fixed DC reference potential to input 22 of DC restoration circuit 18, which DC reference potential is determined solely by the setting of the viewer controlled brightness potentiometer 14. In this case, DC restoration circuit 18 is enabled during the back porch of each horizontal blanking interval of the video signal for charging or discharging an external clamping capacitor 42 for establishing a desired black level by clamping the back porch to the fixed DC reference potential developed at input pin 16. Thus, the video output signal on conductor 28 will be characterized by a fixed black level regardless of the characteristics of the video signal. A DC restoration circuit operating in this mode is commonly said to be characterized by 100% DC coupling. As mentioned previously, it is frequently desirable to reduce the amount of DC coupling from this value of 100% to a value in the neighborhood of typically about 85%. The effect of this reduction in DC coupling is to increase the average background of brightness of a dark scene while decreasing the average background brightness for a highly white scene in order to compensate for broadcast transmission inconsistencies. As will be explained in further detail, the present invention provides a novel circuit for performing this function by dynamically adjusting the reference potential coupled to input 22 of DC restoration circuit 18 in accordance with the DC level or average brightness of the video signal coupled to input 20 of the DC restoration circuit.

Referring back to FIG. 1, it will be observed that the video signal developed at input pin 10 is coupled to an attenuator 44 and therefrom to an inverter 48, the output of inverter 48 being connected by a conductor 50 to conductor 24 at a node 52. Attenuator 44 is selected for attenuating the input video signal developed at pin 10 by about 85% so that the output of inverter 48 represents a signal corresponding to the inverse of 15% of the input video signal. This inverse and attenuated representation of the input video signal is low pass filtered by bypass capacitor 15 and combined at node 52 with the DC reference potential developed at the output of brightness potentiometer 14. As a consequence, the DC potential coupled to input 22 of the DC restoration circuit 18 is a function of the DC level of the input video signal which DC signal is subtracted from the DC reference potential developed by potentiometer 14 at node 52 to form the DC signal coupled to input 22 of the DC restoration circuit.

Figure 2:
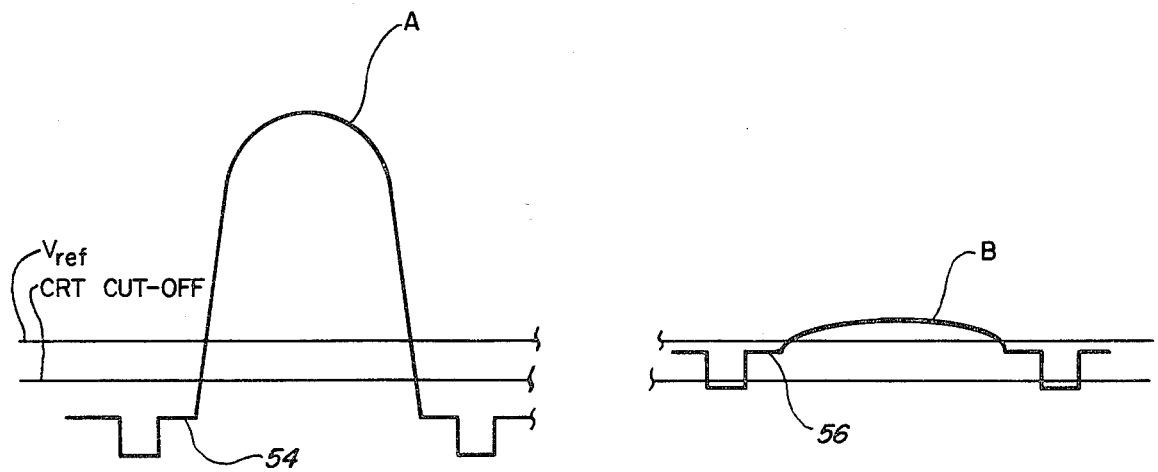
FIG. 2 graphically depicts a pair of video waveforms illustrating the operation of the circuit of FIG. 1.

In operation, assume that the input video signal developed at pin 10 represents a highly white image as reflected by video waveform A of FIG. 2. Due to the high DC level of the video signal represented by waveform A, a correspondingly large negative DC potential is developed at the output of inverter 48, which negative potential represents the inverse of 15% of the DC level of the video signal as previously explained. This negative potential is combined at node 52 with the reference potential developed at input pin 16 by the viewer operable brightness control potentiometer 14 and the difference is coupled to the reference input 22 of the DC restoration circuit by conductor 24. With reference to FIG. 2, it will be recalled that without the effect of the dynamic adjustment signal developed on conductor 50, the DC restoration circuit 18 would operate to clamp the back porch of the horizontal blanking interval of video waveform A at the fixed voltage level established at pin 16 by brightness control potentiometer 14, this fixed level being represented by $V_{ref}$ in FIG. 2. However, due to the presence of the dynamic adjustment signal on conductor 50, the DC voltage coupled to the reference input 22 of DC restoration circuit is decreased thereby decreasing the back porch clamping level. In particular, since the DC level of video waveform A is quite high, the clamping level and thereby the system black level is decreased by a relatively large amount with the back porch being clamped at level 54.

Next, assume that the input video signal represents a relatively dark image as reflected by video waveform B of FIG. 2. In this case, the DC potential coupled to the reference input 22 of DC restoration circuit 18 is again lower than the potential developed at pin 16 by brightness control potentiometer 14 but this time by a smaller amount. That is, since the DC level of video waveform B is relatively small compared to that of video waveform A, the dynamic adjustment signal developed on conductor 50 and subtracted from the DC potential developed at pin 16 will likewise be relatively small. As a result, the DC voltage coupled to input 22 of DC restoration circuit 18 will be less than $V_{ref}$ but not by as much as in the case of video waveform A. The back porch clamping level is thereby only slightly reduced from the fixed level $V_{ref}$ as shown at 56. In this manner, the clamping level of the DC restoration circuit is dynamically adjusted in accordance with the DC level of the input video signal to effect a DC coupling reduction, the amount of the reduction being controlled by attenuator 44.

Referring back to FIG. 1, it will be observed that the cut-off point of CRT 34 is controlled by a CRT cut-off control 58 which comprises a conventional factory adjusted circuit connected to the G2 grid of the CRT. Preferably, circuit 58 is adjusted for establishing a CRT cut-off point which corresponds to a level between the highly white and highly dark back porch clamping levels 54 and 56 respectively as shown in FIG. 2. Since the black level of video waveform A, as determined by back porch clamping level 54, is below the cut-off point of the CRT, the effect is to reduce the average background brightness (i.e. the black level) of the highly white image represented by video waveform A. On the other hand, the black level of video waveform B, as determined by back porch clamping level 56, is above the cut-off point of the CRT thereby increasing the average background brightness or black level of the relatively dark image represented by the video waveform. It will be realized that the effect of the foregoing is to compensate for broadcast transmission inconsistencies by somewhat increasing the average background brightness of a dark image while decreasing the average background brightness of a white image.

What has thus been shown is a DC coupling reduction circuit operable for dynamically adjusting the clamping level of a DC restoration circuit in accordance with the DC level of an input video signal to effectively decrease the average background brightness of white images and to increase the average background brightness of dark images. Moreover, the circuit is particularly suited for incorporation on an integrated circuit chip together with the DC restoration circuit without the necessity for providing additional input pins.

While a particular embodiment of the invention has been shown and described, it will be obvious to those skilled in the art that changes and modifications may be made therein without departing from the invention in its broader aspects, and, therefore, the aim of the appended claims is to cover all such changes and modifications as fall within the true spirit and scope of the invention.

What is claimed is:

1. In a television receiver of the type having means for developing a video signal and including a DC restoration circuit having a reference input, said DC restoration circuit being operable for clamping a portion of the horizontal blanking interval of said video signal to the direct current voltage level presented to said reference input, the improvement comprising:
    means for developing a dynamic adjustment signal representing a selected percentage of said video signal;
    viewer operable means for developing a selected direct current black level reference signal; and
    means combining the direct current level of said dynamic adjustment signal with said direct current black level reference signal and coupling the resulting combined direct current signal to the reference input of said DC restoration circuit, whereby the DC coupling of said DC restoration circuit is reduced in accordance with said selected percentage.

2. The improvement according to claim 1 wherein said dynamic adjustment signal developing means comprises means for attenuating said video signal by said selected percentage and means for inverting said attenuated video signal.

3. The improvement according to claim 2 wherein said combining means comprises means for low pass filtering said dynamic adjustment signal and for summing said low pass filtered dynamic adjustment signal with said direct current black level reference signal for producing said combined direct current signal.

4. The improvement according to claim 1 wherein said selected percentage is about 15%, whereby the DC coupling characterizing said DC restoration circuit is reduced to a value of about 85%.

5. The improvement according to claim 1 wherein said television receiver includes a cathode ray tube and further including means for setting the cut-off point of said cathode ray tube at a level between the combined direct current signals produced in response to said video signal representing a white image and representing a black image.

6. In a television receiver of the type having means for developing a video signal and including a DC restoration circuit having a reference input, said DC restoration circuit being operable for clamping a portion of the horizontal blanking interval of said video signal to the direct current voltage level supplied to said reference input, the improvement comprising:
    means for developing a selected direct current black level reference signal;
    first means responsive to said video signal for developing a dynamic adjustment signal representing the inverse of a selected percentage of said video signal;
    second means responsive to said first means for developing a direct current dynamic adjustment signal representing the average value of said dynamic adjustment signal and combining said direct current dynamic adjustment signal with said direct current black level reference signal for developing a combined signal; and
    means coupling said combined signal to the reference input of said DC restoration circuit.

7. The improvement according to claim 6 wherein said second means comprises a summing node receiving said direct current black level reference signal and said dynamic adjustment signal and low pass filter means connecting said summing node to a source of ground potential.

8. The improvement according to claim 7 wherein said television receiver includes a cathode ray tube and further including means for setting the cut-off point of said cathode ray tube at a level between the levels corresponding to the combined signals produced in response to said video signal representing a white image and representing a black image.

* * * * *